United States Patent [19]
Jewell et al.

[11] Patent Number: 5,525,810
[45] Date of Patent: Jun. 11, 1996

[54] SELF CALIBRATING SOLID STATE SCANNER

[75] Inventors: Jack L. Jewell; Robert P. Bryan; Winston S. Fu; Stan E. Swirhun; William E. Quinn, all of Boulder, Colo.

[73] Assignee: Vixel Corporation, Broomfield, Colo.

[21] Appl. No.: 239,827

[22] Filed: May 9, 1994

[51] Int. Cl.[6] .............................. G06K 7/14; G06K 9/22
[52] U.S. Cl. ............................................. 250/566; 235/462
[58] Field of Search ...................................... 250/566, 568; 235/454, 462, 470, 472

[56] References Cited

U.S. PATENT DOCUMENTS

| | | | |
|---|---|---|---|
| 3,680,049 | 7/1972 | Tsukada | 250/553 |
| 3,736,410 | 5/1973 | Ragland et al. | 250/569 |
| 3,801,775 | 4/1974 | Acker | 235/470 |
| 4,411,016 | 10/1983 | Wakeland | 382/62 |
| 4,591,706 | 5/1986 | Sims | 235/454 |
| 4,694,182 | 9/1987 | Howard | 250/566 |
| 4,742,220 | 5/1988 | Beyor | 250/216 |
| 4,743,773 | 5/1988 | Katana et al. | 250/566 |
| 4,816,659 | 3/1989 | Bianco et al. | 235/462 |
| 4,818,886 | 4/1989 | Drucker | 250/566 |
| 4,877,949 | 10/1989 | Danielson et al. | 235/462 |
| 4,939,356 | 7/1990 | Rando et al. | 235/467 |
| 5,015,831 | 5/1991 | Eastman et al. | 235/462 |
| 5,019,698 | 5/1991 | Eastman | 235/462 |
| 5,021,641 | 6/1991 | Swartz et al. | 235/467 |
| 5,028,770 | 7/1991 | Miyazaki et al. | 235/462 |
| 5,120,940 | 6/1992 | Willsie | 235/462 |
| 5,170,277 | 12/1992 | Bard et al. | 359/210 |
| 5,206,491 | 4/1993 | Katoh et al. | 235/467 |
| 5,210,398 | 5/1993 | Metlitsky | 235/462 |
| 5,218,191 | 6/1993 | Chadima, Jr. et al. | 235/472 |
| 5,233,170 | 8/1993 | Metlitsky et al. | 235/462 |
| 5,247,161 | 9/1993 | Actis et al. | 235/462 |
| 5,254,844 | 10/1993 | Krichever et al. | 235/462 |
| 5,258,605 | 11/1993 | Metlitsky et al. | 235/462 |
| 5,319,182 | 6/1994 | Havens | 235/462 |

FOREIGN PATENT DOCUMENTS

3839772A1  5/1990  Germany.
63-198177  8/1988  Japan.

*Primary Examiner*—Stephone Allen
*Attorney, Agent, or Firm*—Fisher & Associates

[57] ABSTRACT

A solid-state scanner for reading bar codes or projecting images is described. The scanner operates either in a reading mode or a calibrate mode using the same hardware. Use of two-dimensional array light sources minimizes the size of the semiconductor chips containing the light source arrays is provided. Use of oversampling or anamorphic optical systems increase tolerances to angular misorientations is also discussed. Used in conjunction with a mechanical scanning device, the scanner is capable of reading two-dimensional bar codes or generating two-dimensional images.

45 Claims, 5 Drawing Sheets

SELF CALIBRATING SOLID STATE SCANNER

BACKGROUND OF THE INVENTION

1. Field of the Invention

The present invention relates to a semiconductor laser array, optics, detector and processor configured with the capability of reading bar codes without the use of moving parts or in the presence of defects in some of the laser elements or in the optics.

2. Description of the Prior Art

Bar codes and bar code scanners are used in increasingly broad applications, the most familiar being in the supermarket. Most bar code scanners use a single light source, typically a semiconductor laser, and rely upon a rotating or vibrating mirror or upon relative motion between the scanner and the bar code to read the bar code. Power consumption by these moving elements is a detriment for hand-held scanners. Furthermore the mechanical assemblies are not as rugged as solid-state mechanisms. If either the laser or the scanning mechanism fails, the scanner will be rendered inoperable. Other bar code scanners have no moving parts. These scanners use a single light source or a simultaneously driven plurality of sources, typically light-emitting diodes (LED's), and an array of detectors onto which a bar code is imaged. These scanners suffer from limited depth of focus and signal to noise ratio.

Metlitsky et al., in U.S. Pat. No. 5,258,605, describes a bar code scanner employing electronic rather than mechanical means for causing the light beam to scan a bar code symbol by using a linear array of light sources. While the invention represents a significant advance in the art, it has shortcomings, including restriction to a linear array configuration, the need for a separate monitoring photodetector and lack of ability to compensate for transmission nonuniformity in the optical system.

SUMMARY OF THE INVENTION

It is therefore an object of the present invention to provide a solid-state scanner comprising an array of semiconductor diode lasers, a detector, and logic circuitry which will provide the ability to read bar codes in the absence of any mechanical motion.

It is a further object to provide a solid-state scanner or reader which combines the best features of the prior art scanners, namely large depth of field, large signal to noise ratio, and solid-state operation.

It is yet another object to provide a solid-state scanner which is capable of reading bar codes even under conditions that some of the light sources are defective or completely inoperative.

It is yet another object to provide a solid-state scanner which makes use of two-dimensional arrays of light sources and may employ the same photodetector for reading bar codes and for individually calibrating the light source outputs and optical system transmission.

It is yet another object to utilize the results of calibration for individually adjusting the power applied to the light sources to increase output uniformity and/or to modify the signals obtained from subsequent readings to increase the accuracy of the readings.

It is yet another object to provide a solid-state scanner having a number of light source elements which may be larger than the resolution elements of the bar code and therefore by oversampling the target, the scanner has increased tolerance to angular misalignment and to failure of a light source.

It is yet another object to provide a solid-state scanner having an array of light sources with typically 200 or more elements and is preferably a two-dimensional array.

It is yet another object to provide a solid-state scanner having optical means for further improving the scanner's performance.

It is yet another object to provide a solid-state scanner which may be utilized as a bar code scanner.

In all of the above embodiments, it is an object to provide a solid-state scanner which comprises an array of light sources having sufficient number and configuration and configured such that a standard bar code may be read without the need of mechanical motion and in the condition that some of the light sources have defective outputs. Although the scanner is designed for reading bar codes, it may be used for displaying images.

According to one broad aspect of the present invention, there is provided a solid-state scanner which comprises an array of light sources, each of the light sources emitting a light beam when activated, at least one of the light sources being inactive at a given time; a power supply for selectively activating the light sources; a target which reflects or scatters at least a portion of the light beams; a transmitting optical system for relaying the light beams to the target; at least one photodetector for monitoring light from the sources which is reflected or scattered by the target, the photodetector generating a signal in response thereto; transmitting means for transmitting the signal away from the detector, the signal being useable either for being indicative of bar code patterns on the target or for calibration of light transmitted through the transmitting optical system; processing means for interpreting said signal to recognize one or more bar code patterns contained on the target, the processing means including error preventing means to compensate for defects in at least one of the light sources.

Other objects and features of the present invention will be apparent from the following detailed description of the preferred embodiment.

BRIEF DESCRIPTION OF THE DRAWINGS

The invention will be further described in conjunction with the accompanying drawings, in which.

3

DETAILED DESCRIPTION OF THE PREFERRED EMBODIMENTS

Figure 1:
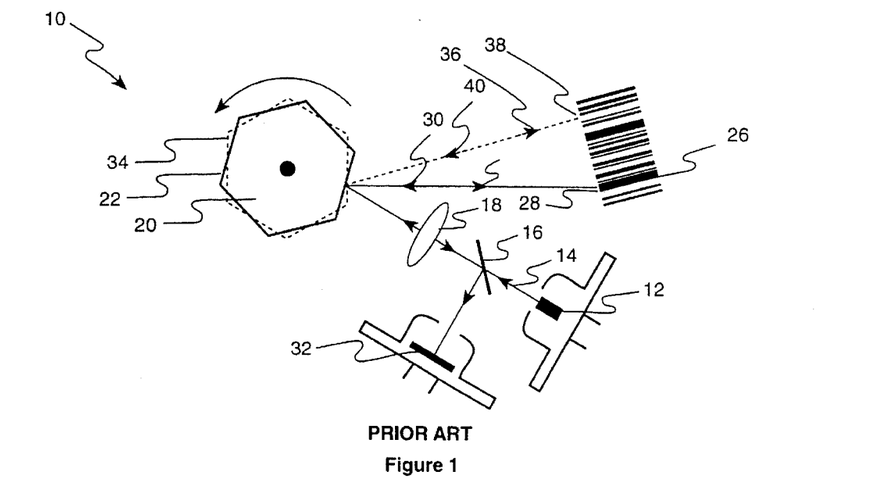
FIG. 1 is a top sectional view of a prior art scanner utilizing a single laser, single detector, and mechanical rotary motion to perform scanning.

With reference to the Figures, wherein like reference characters indicate like elements throughout the several views and, in particular, with reference to FIG. 1, there is shown a top sectional view of a scanner 10, which exemplifies the prior art. Laser 12, illustrated here as a semiconductor laser, emits a light beam 14 of which a portion passes through beamsplitter 16, is collected by lens 18 and is reflected by rotating reflector 20. When rotating reflector 20 is in position 22, deflected light beam 24 is incident upon bar code 26 at position 28. For illustrative purposes, bar code 26 is shown in a face-on view, rather than the top view. Some of deflected light beam 24 is reflected and/or scattered from position 28 of bar code 26, such that it retraces the incident path, forming returning light beam 30. Returning light beam 30 reflects from rotating reflector 20 (still in position 22) and passes through lens 18. Some of returning beam 30 then reflects from beamsplitter 16 and is incident onto photodetector 32. Although not shown in FIG. 1, it is well known in the art that photodetector 32 will send a signal to processing means which enables the bar code to be interpreted by means of the scan. When rotating reflector 20 is in another position 34, deflected light beam 36 is incident upon bar code 26 at position 38, a portion of which is reflected and/or scattered to form returning light beam 40, and eventually reaches photodetector 32 in a similar fashion as described for returning light beam 30.

Figure 2A:
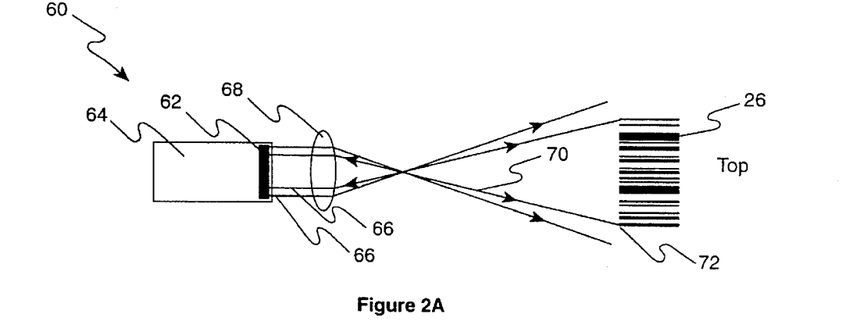
FIGS. 2A, 2B and 2C show respective top and side planar views of the scanner constructed, in accordance with the present invention.
Figure 2B:
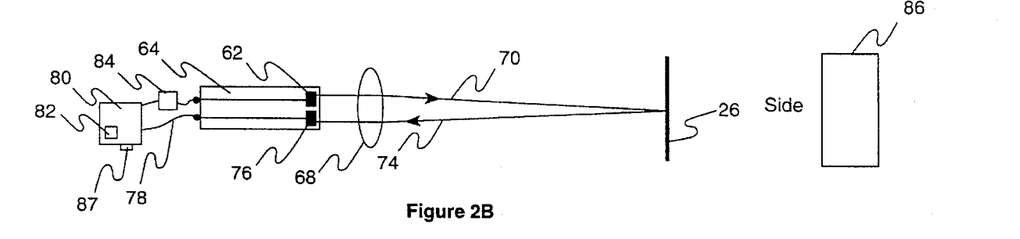
Figure 2C:
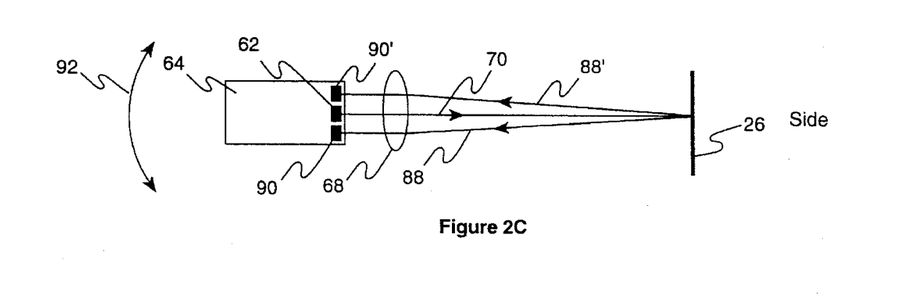

Referring now to FIGS. 2A, 2B and 2C, there are shown top and side views of solid-state scanner 60 in accordance with the present invention. The top view of FIG. 2A shows light source array 62, residing in housing 64, and emitting an array of light beams 66, typically in a rastered sequence. Light beams 66 are directed onto bar code 26 by lens 68. With the bar code 26 and scanner 60 positioned, as illustrated in FIG. 2A, it is seen that scanner 60 scans light beams 66 over a wider area than bar code 26. This allows for tolerance in the relative lateral positioning of bar code 26 with respect to scanner 60. Light beam 70 incident on the boundary 72 of bar code 26 therefore does not necessarily originate from an outermost element of light source array 62. Preferably, light source array 62 comprises an array of vertical-cavity surface-emitting lasers (VCSEL'S). In a preferred mode of operation, the elements of light source array 62 are activated sequentially, one at a time, each element addressing a different position on bar code 72. A typical example of bar code 26 has one-hundred twenty-eight lines or spaces. In order to read such a barcode with reasonable lateral positional tolerance and angular tolerance, it is desirable to have approximately 500 elements in light source 62. More or fewer elements may be used in light source array 62 to accommodate greater or smaller tolerances, or to read greater or smaller numbers of lines/spaces in bar code 26.

Referring now to the side view of FIG. 2B, there is shown returning beam 74, resulting from reflection and/or scattering of light beam 70 from bar code 26, which passes through lens 68 and reaches photodetector 76.

Although FIG. 2B shows returning beam 74 passing through the same optical system 68 upon its return, it is possible to have a receiving optical system (not shown) through which returning beam 74 is directed onto photodetector 76. It is possible to have light source array 62 and photodetector 76 integrated onto a single semiconductor chip to minimize costs of assembling scanner 60. Photodetector 76 generates a signal stream 78 whose amplitude is approximately proportional to the intensity of returning beam 74, and sends signal stream 78 into decoding means 80. Processing means 80 comprises means necessary for reading the scan and may include feedback means 82. Processing means 80 may control the power to light source array through power controller 84. In operation of scanner 60, nonuniform output power of the elements of light source array 62 may cause degradation of the scanning reliability. To provide a calibration of the light source outputs and the transmission of lens 68, uniform screen 86 may be placed in the path of light beams 66. The signals thus read, provides processing means 80 with information of the output strengths of the elements of light source array 62, which may be sent to power controller 84 to modify the power sent to light source array 62. This technique may be used to increase the uniformity of returning beams 74. Alternatively, compensation for nonuniform light sources may be performed by modification of signal stream 78 or by modification of the interpretation of signal stream 78 by decoding means 80. Uniform screen 86 may typically comprise a white sheet of paper, cardboard, or other material, and uniform screen 86 may be configured to reside in a precise location when a calibration is being performed. It may be advantageous for processing means 80 to include calibration switch 87, which may be set in order to indicate to processing means 80 that a calibration reading is taken. Alternatively, processing means 80 may include sufficient complexity to recognize when a uniform screen is being scanned and, in such cases, automatically perform a calibration and compensation routine. Use of the calibration techniques described herein is advantageous in that it allows compensation for any defects in the entire system, e.g., nonuniform transmission of optical system 68, as well as nonuniform output from light source array 62. Compensation for defects found in the described calibration readings may extend even to the case where one or more light sources completely fail. In this case, processing means 80 will ignore readings corresponding to failed light sources. Additionally, processing means 80 may instruct power controller 84 not to send power to failed light sources.

Referring now to FIG. 2C, there is shown a side view of a modified configuration of scanner 60. Light source array 62 emits light beam 70, a portion of which is reflected or scattered into returning beams 88 and 88', which are incident onto photodetectors 90 and 90', respectively. The configuration illustrated in FIG. 2C provides increased tolerance to the elevational orientation 92. Both photodetectors 90 and 90' may be used both for reading bar codes 26 or for scanning uniform screens 86.

In operation of scanner 60, it is advantageous for processing means 80 to include means for recognition of the extreme ends of bar code 26 and to use this information to determine the translational and rotational orientations of bar code 26 with respect to the array of light beams 70. Knowledge of these orientations is desired for proper interpretation of signal stream 78. Electronic scanning allows the possibility of scanning at higher rates than are practical by mechanical scanning. In this case, multiple scans may be averaged to improve the reliability over a single scan. It is advantageous to determine the orientation of bar code 26 with respect to array of light beams 70 more frequently than the orientations are likely to change, otherwise changes in the orientation during a series of averaged scans would adversely affect the reliability of the averaged scan. When orientations are determined with appropriate frequency, advantage may be taken of random motions, caused for example by an unsteady hand holding the scanner, during a series of averaged scans. For example, if a light source element is not operating, the "dark spot" resulting from the failed element will move about, allowing every position to be read within at least one of the multiple scans to be averaged. Combined with appropriate compensation in processing means 80 for defective or failed light sources, the use of averaged multiple scans may almost completely eliminate undesirable effects resulting from failed light sources. It is also possible to adjust the rate of scanning in scanner 60 for optimum adaptation to various scanning conditions.

In the simplest operation of source array 62, or other source arrays described hereafter, at most, one light source element will be activated at any one time. Through use of signal separation means (not shown) within processing means 80, it is possible to operate two or more light sources simultaneously and separate the signals. For example, light sources may be simultaneously activated and modulated at different frequencies, e.g., 50 and 100 MHz, each of which are much higher than the scan rates of scanner 60. In this case, processing means 80 should contain frequency filters appropriate for separating electronic signals at 50 and 100 MHz.

The capability of scanner 60 may be extended through combination with a mechanical scanning means which may be similar to rotating reflector 20 of FIG. 1. In this case, the effective one-dimensional electronically-generated scan combines with the orthogonally oriented mechanical scan to produce a two-dimensional scan, suitable for reading of two-dimensional bar codes or multiple bar codes.

Figure 3:
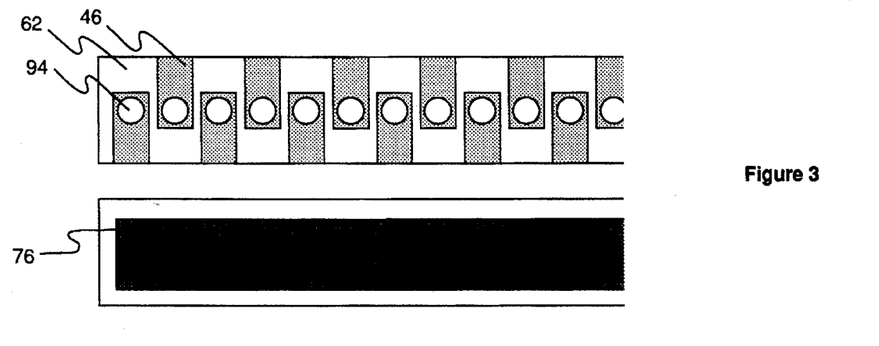
FIG. 3 is a face-on planar view of a linear array of light sources and a detector in accordance with a preferred embodiment of the present invention.

Referring now to FIG. 3, there is shown a face-on view of portions of linear light source array 62 and photodetector 76. Light sources 94 are shown arranged in a linear array. Due to the large number (approximately 500) of light sources 94, the entire source array 62 is not shown in FIG. 3 or the following figures. Light sources 94 are electrically addressed via individual contacts 96. Light beams 66 (not shown) emit perpendicular to the illustration, i.e., straight out from the page. Photodetector 76 is shown in a rectangular form whose dimensions are approximately the same as the dimensions of linear light source array 62, however, photodetector may take any form. Furthermore, photodetector 76 may comprise a plurality of photodetectors, an example of which is illustrated in FIG. 2C with photodetectors 90 and 90'. In practice, linear light source array 62 has practical limitations. If 500 elements are spaced on a close 20 μm pitch, a 1 cm long chip is required, which uses a large chip area or is easily broken during manufacturing.

Figure 4:
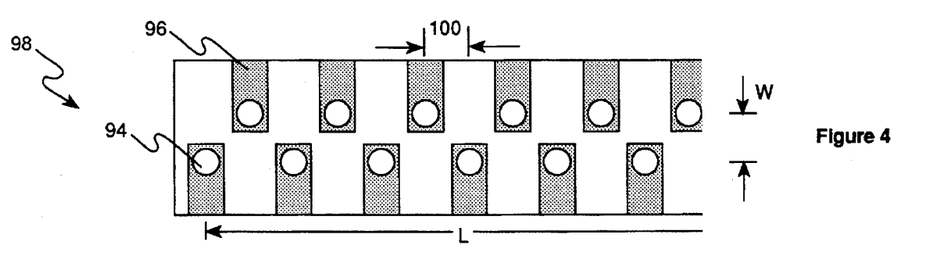
FIG. 4 is a face-on planar view of an array of light sources addressed by sequencing electronics in accordance with a preferred embodiment of the present invention.

Referring now to FIG. 4, there is shown staggered light source array 98 having a width W and a length L. Due to the size of staggered light source array 98 and of similar light source arrays to follow, the full extent of length L is not completely shown, but length L is understood to be the distance between the centers of the two light sources 94 at the extreme ends of staggered light source array 98. An advantage of staggered light source array 98 over linear light source array 62 is that light sources 94 are spaced further apart, resulting in reduced crosstalk and heating effects. Alternatively, light sources 94 may have a smaller length spacing 100 in staggered light source array 98 than in linear light source array 62 and, therefore, may be contained in a smaller chip. Length spacing 100 is understood to be the spacing between the centers of adjacent light sources 94 in the direction of the length L. Variations of staggered light source array 98 are also possible, for example, having more than two rows, irregular configurations, or more than one light source.

Figure 5:
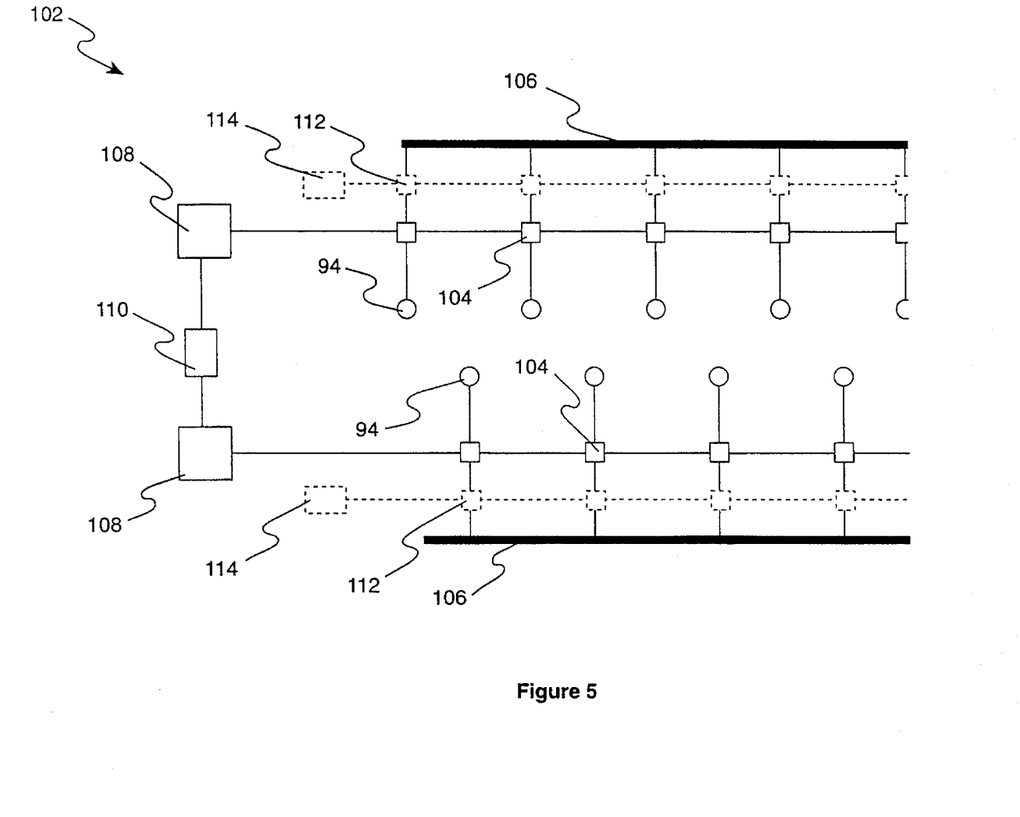
FIG. 5 is a face-on planar view of a two-dimensional staggered array of light sources in accordance with a preferred embodiment of the present invention.

Referring now to FIG. 5, there is shown sequenced light source array 102 in which light sources 94 are addressed through dividers 104, which block or pass electrical current from power supply line 106. Sequencers 108 generate sequences of electrical pulses (not shown) which are fed into dividers 104. Typically, when there are N dividers 112 connected to a sequencer 108, dividers 112 will gate the current from power supply lines 106 at every Nth electrical pulse counted. Furthermore, different dividers 104 typically gate the current at different times, resulting in a sequential activation of light sources 94. If more than one sequencer 108 is used, as illustrated in FIG. 5, it is advantageous to connect them through controlling element 110. Controlling element 110 may control the timing of the pulses sent to dividers 104, for example, to prevent more than one light source 94 from being activated at one time. It is also possible to activate more than one light source 94 at a time in a controlled manner. Sequencing electronics may be used advantageously to greatly reduce the number of electrical connections made between processing means 80 (shown in FIG. 2B) and the chip containing light source array 102 and its associated sequencing electronics. An individually-addressed light source array comprising 500 elements requires at least 500 connections. Use of sequencing electronics has the potential to reduce the number of connections to less than 10.

Whether or not sequencing electronics are used, it is possible to modify the power of light sources 94 by use of power modifiers 112, which are controlled by power controllers 114. An example of the use of power modifiers 112 and power controllers 114 is to increase the output uniformity of light sources 94. In the description of FIG. 2B, uniform screen 86 was used to provide output power information to processing means 80. Processing means 80 may process the output power information and send appropriate signals to power controllers 114, which in turn cause power modifiers to pass an increased or decreased electrical power to light sources 94. The power modification may be in the form of modifying the electrical current or voltage supplied to light sources 94, or in modifying the length of time which light sources 94 are activated, or by other means. Power modifiers 112 and power controllers 114 may also reside remotely from light source array 102 as exemplified by power controller 84 of FIG. 2B. In this case a reduced number of power modifiers 112 or even a single power modifier 112 may replace the power modifiers 112, which in the example illustrated in FIG. 5, exist on a one-to-one basis with light sources 94.

Figure 6:
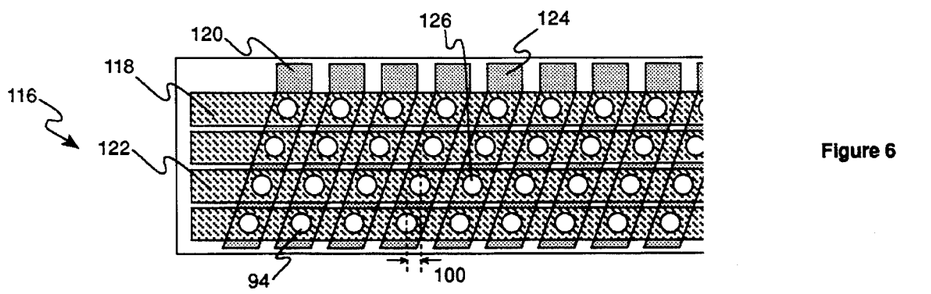
FIG. 6 is a face-on planar view of a matrix addressed two-dimensional array of light sources in accordance with a preferred embodiment of the present invention.

Referring now to FIG. 6, there is shown a face-on planar view of matrix-addressed array 116 comprising light sources 94 which are matrix addressed by row contacts 118 and column contacts 120. The contacts are electrically connected to entire rows or columns of light sources 94. Only when both contacts of a light source 94 are activated will light source 94 emit light. For example, if only row contact 122 and column contact 124 are activated, the only light source 94 in all of matrix addressed array 116 which will emit light is the one labeled 126. One advantage of the matrix-addressed configuration is reduced number of contacts compared to individual addressing. For a two-dimensional M×N array (M elements per column, N elements per row), individual addressing requires M multiplied by N (M×N) contacts, while matrix addressing requires only M added to N (M+N) contacts. For bar code scanning, an 8×64 matrix configuration may be used to address a 512-element matrix-addressed array 116. FIG. 6 shows a 4-row matrix-addressed array 116 for illustrative purposes. An advantage of having many rows in a two-dimensional array is that the length spacing 100 may be reduced to a distance much smaller than the size of light sources 94, allowing for continuous scanning in the length dimension.

Figure 7:
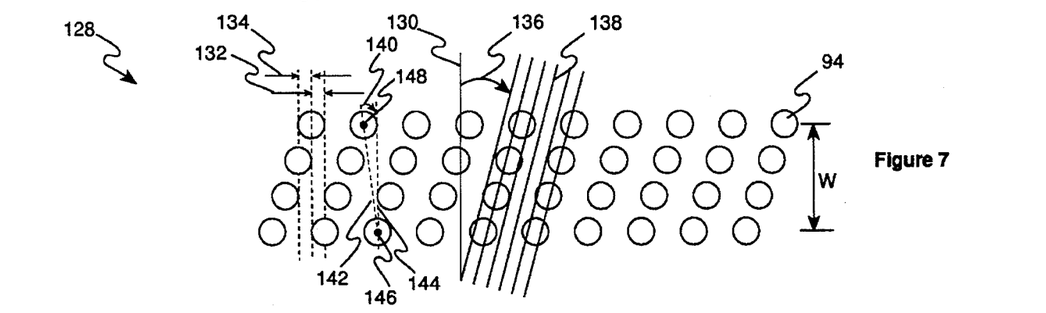
FIG. 7 is a schematic view of a two-dimensional array of light sources, illustrating the effect of angular misorientation.

Referring now to FIG. 7, there is shown a schematic view of two-dimensional array 128 which illustrates the inherent sensitivity to angular misorientation. Array 128 is designed to read bars 130 oriented as shown. With proper orientation, the length spacing 132 between light sources 94 in a column is equal to the length spacing 134 between adjacent columns, in which case a bar code may be scanned continuously. However if the bar code is not properly oriented, for example rotated by angle 136, and exemplified by bar 138, there exists the possibility of a bar 138 not being read by scanning of array 128.

If the spots of light incident on a bar code have diameters approximately equal to their length spacing 132 multiplied by the magnification of the transmitting optical system exemplified by lens 68 in FIG. 2B, the angular tolerance f may be easily estimated to be approximately one half of angle 140. Angle 140 is defined by two lines 142 and 144, both passing through the center of light source 146. Line 142 also passes through the center of light source 148, and line 144 is parallel to the lines which define the proper angular orientation by having equal length spacings 132 and 134. The tangent of angle 140 is equal to the tangent of the value of the length spacing 132 divided by the width W. For an 8×64 array, a typical angular tolerance f is slightly larger than 1 degree, or 0.01745 radians. Thus, a straightforward approach to using a two-dimensional array is limited to applications where strict control is held on the relative angular orientation between light source array 128 and bar code 26.

There are at least three basic approaches to increasing the angular tolerance f: (1) modification of the arrangements of light sources 94; (2) use of oversampling; and (3) modification of the arrangements of light beams 70. FIGS. 8A, 8B, 8C and 8D illustrate a variety of light source array configurations which modify the arrangements of light sources 94 and/or implement oversampling to increase the angular tolerance f.

Figure 8A:
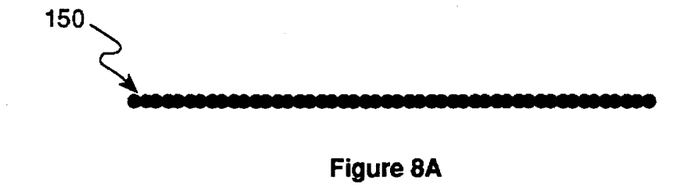
FIGS. 8A, 8B, 8C and 8D are a series of schematic views of different configurations of light sources which increase the tolerance to angular misorientation.

Referring now to FIG. 8A, there is shown linear light source array 150. Linear light source array 150 is highly tolerant to angular orientation. The angle which is analogous to angle 140 of FIG. 7 is 90 degrees, i.e., only the most extreme angular misorientation causes a scanning failure. As previously described however, linear light source array 150 has practical limitations.

Figure 8B:
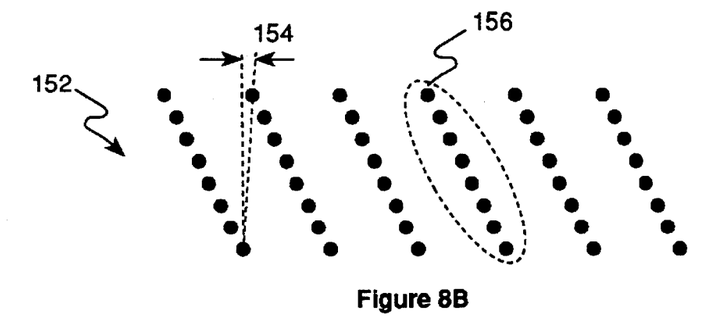

Referring now to FIG. 8B, there is shown light source array 152 which has the same configuration as light source array 128 of FIG. 7. Angle 154, analogous to angle 140 of FIG. 7 is very small. Angle 154 may be increased by a factor of N times by extending each column 156 by N elements.

Figure 8C:
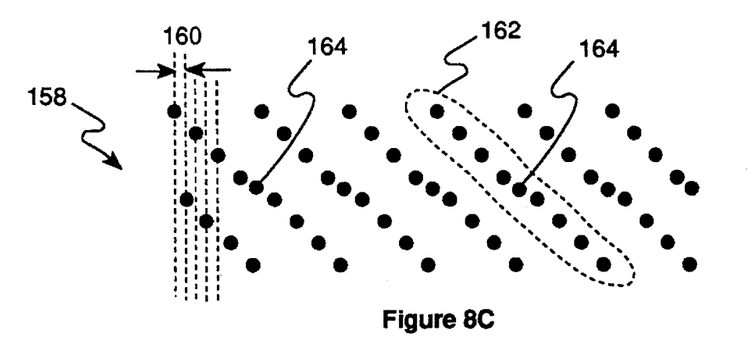

Referring now to FIG. 8C, there is shown light source array 158 having only a slightly larger number of elements than light source array 152 in which the angular tolerance f is greatly increased. In light source array 158, it is seen that the length spacing 160 occurs between light sources 94 which are not adjacent. In light source array 158, array columns 162 are seen to be "tilted" at an angle about twice that of the array columns 156 of light source array 152. Also in light source array 158, there are two length spacings 160 between adjacent column elements. To make light source array more effective, it is desirable to add at least one oversampling light source 164 into each array column 162 as shown.

Figure 8D:
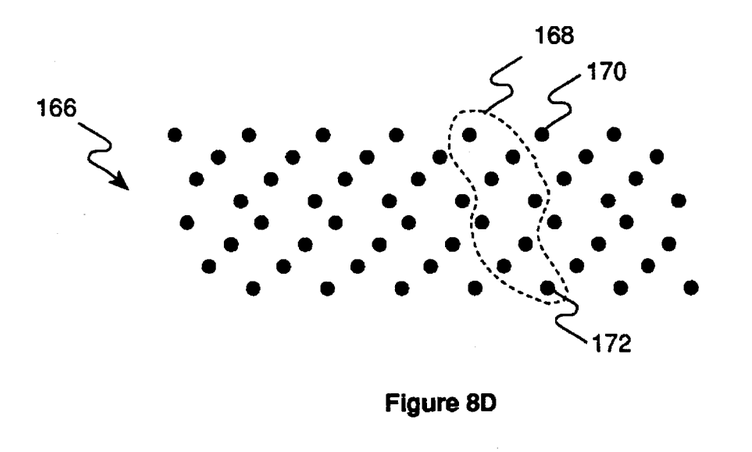

Referring now to FIG. 8D, there is shown irregular light source array 166 in which light sources 94 of array column 168 do not lie in a straight line. In characterizing light source array 152 of FIG. 8B, it is seen that the angular tolerance is asymmetric, i.e., it is much more sensitive to angular misorientation in one direction than in the other direction. Irregular light source array 166 has a more symmetric angular sensitivity. The angular tolerance f of irregular light source array 166 is difficult to quantify, since light sources 94 may be placed in any configuration. It may be seen however, just as in the case of light source array 158 of FIG. 8C, that in the absence of any oversampling, the angular tolerance f will be very small. Oversampling may be accomplished through addition of light sources 94 within the array as was illustrated in FIG. 8C, or by extending array columns 168. Oversampling may also be accomplished by overlapping adjacent array columns 168, which is the configuration illustrated in FIG. 8D. The overlap of adjacent array columns 168 may be seen in FIG. 8D by observing that light source 170 lies to the left of light source 172.

Figure 9:
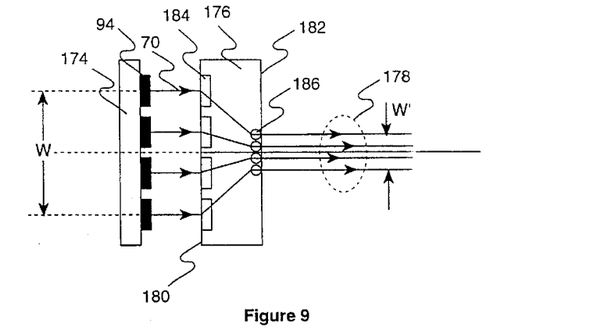
FIG. 9 is a side sectional view of a scanner utilizing a two-dimensional array of light sources and an optical system which increases the length to width ratio of the array of light beams.

Referring now to FIG. 9, there is shown a method for modifying the configuration of light beams 70 relative to the configuration of light sources 94 in light source array 174, in order to increase the angular tolerance f. FIG. 9 is a side sectional view of a simplified array column of width W of light sources 94. Optical system 176 decreases width W of light source array 174 to a reduced width W' of modified beam array 178. Optical system 176 may have entrance surface 180 and exit surface 182, and may comprise a single component, as shown. Optical system 176 may comprise entrance elements 184 and exit elements 186 as illustrated in FIG. 9, or it may comprise a birefringent material or other means for modifying reduced width W' of modified beam array 178. The configuration in the horizontal dimension of light source array 174, not illustrated in FIG. 9, may or may not be affected by optical system 176. When optical system 176 differently affects the vertical and horizontal dimensions of modified beam array 178, optical system 176 is said to be anamorphic.

Figure 10A:
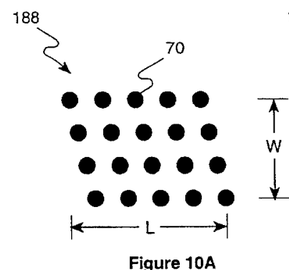
FIGS. 10A, 10B and 10C show top planar views of a two-dimensional array of light beams in which the length to width ratio of the array of light beams has been modified by an optical system.
Figure 10B:
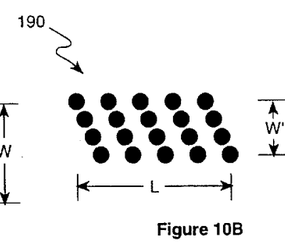
Figure 10C:
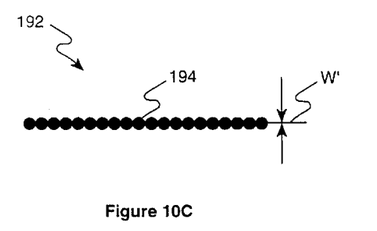

Referring now to FIGS. 10A, 10B and 10C, there is shown the effects of optical system 176 on modified beam array 178. In FIG. 10A, configuration 188 illustrates the configuration of light beams 70 as they are emitted from light source array 174. For simplicity of illustration, configuration 188 has only 20 elements. It is to be understood that the specific configuration 188 illustrated is only an example. Configuration 188 may take on any configuration, including those illustrated in FIG. 8. FIG. 10B shows modified beam array 190 in which the ratio W'/L has been reduced by approximately a factor of two. Reducing W'/L by a factor of two may increase the angular tolerance f by a factor of approximately two or more. FIG. 10C illustrates the extreme case when the reduced width W' is zero, i.e., modified beam array 192 becomes a linear array. FIG. 10C also illustrates that the diameters of modified beams 194 may also be modified by optical system 176, however the most important factor for angular tolerance is the ratio W'/L.

Figure 11A:
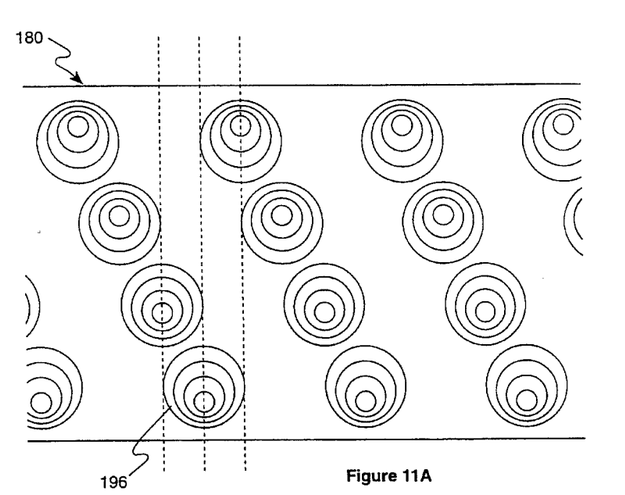
FIGS. 11A and 11B are top planar view of an array of anamorphic diffractive lenslets used for increasing the length to width ratio of the array of light beams.
Figure 11B:
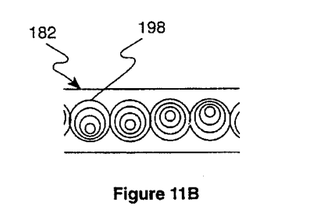

Referring now to FIGS. 11A and 11B, there are shown face-on planar views of entrance surface 180 and exit surface 182 of an example of an anamorphic optical system such as optical system 176 shown in FIG. 9. In this example, diffractive lenses 196 on entrance surface 180 simultaneously focus and deflect light beams 70 (not shown) to exit surface 182. Diffractive lenses 198 collimate and deflect the beams of modified beam array 178. Diffractive lenses 196 have a configuration approximating the configuration of light source array 174, and diffractive lenses 198 have a configuration approximating the configuration of modified beam array 178. FIG. 11B shows only four diffractive lenses 198, corresponding to the four diffractive lenses 196 comprising a single column of light source array 174. Although the illustrated diffractive lenses 196 and 198 represent a preferred embodiment of optical system 176, other methods may be used, for example, off-axis refractive or gradient index lenses, lenses with prisms, lenses with diffraction gratings, holographic elements or other beam deflecting methods. Optical system 176 may be manufactured, for example, by molding a single piece of glass or plastic. Alternatively, optical system 176 may be formed on a wafer of sapphire or glass or other material by photolithography and etching or by embossing.

Figure 12:
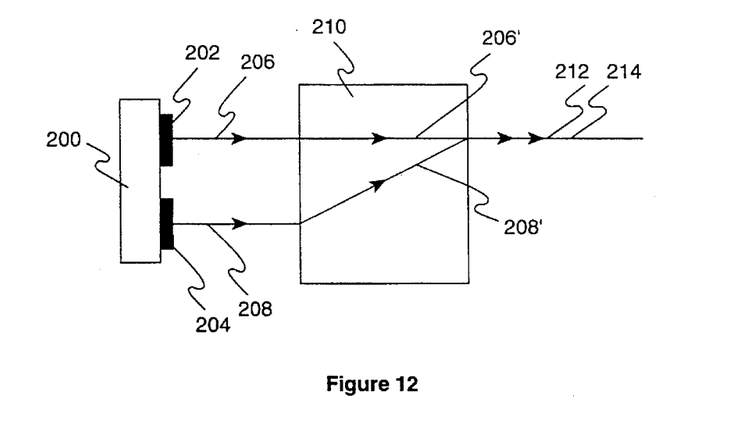
FIG. 12 is a side sectional view of a birefringent optical material used for increasing the length to width ratio of the array of light beams.

Referring now to FIG. 12, there is shown another approach to decreasing the width W' of modified beam array 178. Polarized light source array 200, comprising polarized light emitters 202 and 204, emits at least 2 light beams 206 and 208, such that light beam 206 has a polarization state approximately orthogonal to the polarization state of light beam 208. Polarization sensitive material 210 will then act differently on light beams 206 and 208. Light beam 206', in this example an ordinary beam, propagates through polarization sensitive material 210 in accordance with Snell's Law of refraction, which is well known in the art of optics. Light beam 208' is termed an extraordinary beam which does not follow Snell's Law. Polarization sensitive material 210 may, therefore, affect light beams 206' and 208' differently, and in this example, bring them together. Light beams 206' and 208' emerge from polarization sensitive material 210 as modified beams 212 and 214 and propagate normally in the absence of any other polarization sensitive material, and in the illustrative example, the width W' of the beam array has been reduced to zero. Polarization sensitive material 210 may comprise a birefringent material, in which case light beams 206 and 208 are preferably linearly polarized, or it may comprise an optically active material in which case light beams 206 and 208 are preferably circularly polarized. Use of polarization sensitive material 210 is advantageous in that no fine alignment is required, however, it is limited to producing only two different propagation configurations corresponding to two orthogonal polarization states.

It is to be appreciated and understood that the specific embodiments of the invention are merely illustrative of the general principles of the invention. Various modifications may be made upon the preferred embodiments described consistent with the principles set forth. In particular, the scanner may be used for the projection of images, either in one dimension or in two dimensions, and may be used to project moving images. The scope of this invention is indicated by the appended claims, rather than by the foregoing description.

What is claimed is:

1. A solid-state scanner comprising:

an array of light sources, each of said light sources emitting respective light beams when activated, at least one of said light sources being inactive at any given time;

a target which reflects or scatters at least a portion of said light beams;

a transmitting optical system for relaying said light beams to said target;

a power supply for selectively activating each of said light sources at an optimal power level to compensate for said transmitting optical system transmissivity of each of said respective light beams;

at least one photodetector for monitoring light from said sources which is reflected or scattered by said target, said photodetector generating a signal in response thereto;

transmitting means for transmitting said signal away from said detector;

said signal being useable either for being indicative of bar code patterns on said target or for calibration of each of said light beams transmitted through said transmitting optical system; and processing means for interpreting said signal to recognize one or more bar code patterns contained on said target including error preventing means to compensate for defects, including non-catastrophic defects, in at least one of said light sources and in said transmitting optical system said transmissivity of each of said respective light beams.

2. The scanner recited in claim 1 in which said array of light sources have at least eight elements.

3. The scanner recited in claim 1 in which said light sources and said detector are integrated on a single semiconductor chip.

4. The scanner recited in claim 1 in which said light sources are addressed by sequencing electronics.

5. The scanner recited in claim 1 in which said transmitting optical system comprises optical elements selected from the group consisting of microlenses, microprisms, hologram, or birefringent materials, and a combination thereof.

6. The scanner recited in claim 1, further comprising a decoding means which compensates for translational or angular variations.

7. The scanner recited in claim 1 in which said light sources are scanned with an adjustable scan rate.

8. The scanner recited in claim 1 wherein said at least one photodetector is only a single photodetector.

9. The scanner recited in claim 1 further comprising mechanical scanning means.

10. The scanner recited in claim 1, further comprising a switch to indicate to said processing means that a calibration is taking place.

11. The scanner recited in claim 1 in which said processing means has recognition means to determine automatically whether a calibration target or a bar code is being read.

12. The scanner recited in claim 1 in which said light sources comprise optical cavities.

13. The scanner recited in claim 12 in which said light sources comprise semiconductor lasers.

14. The scanner recited in claim 13 in which said lasers comprise vertical-cavity surface-emitting lasers.

15. The scanner recited in claim 1 in which said array of light sources is two-dimensional, comprising rows along an array length and columns along an array width, said length being greater than said width.

16. The scanner recited in claim 15 in which at least one row or column of lasers is oriented in a non-straight-line configuration.

17. The scanner recited in claim 15 which has an angular orientation tolerance greater than 2 degrees or greater than 0.0349 radians.

18. The scanner recited in claim 15 in which polarization sensitive optics are used to modify the ratio of length to width of said array of light beams.

19. The scanner recited in claim 1 in which said transmitting optical system is anamorphic.

20. The scanner recited in claim 19 in which said array of light sources is two-dimensional, having a length and a width, and which produces an array of light beams focused onto said target, in which the ratio of length to width of said array of light beams is larger than the ratio of length to width of said array of light sources.

21. The scanner recited in claim 1, further comprising at least one receiving optical system for directing said light beams from said target to said at least one detector.

22. The scanner recited in claim 21 in which said transmitting and receiving optical systems are the same optical system.

23. The scanner recited in claim 1 in which said light sources are disposed so as to oversample said target.

24. The scanner recited in claim 23 in which said error preventing means allows said scanner to operate even in the absence of at least one of said light beams.

25. The scanner recited in claim 1 in which multiple scans are averaged to produce an averaged scan having improved reliability over a single scan.

26. The scanner recited in claim 25, further comprising correcting means which allows variations of positions of said optical beams from one of said multiple scans to another of said multiple scans and prevents variations in position from significantly adversely affecting the reliability of said average scan.

27. The scanner recited in claim 1 in which said target comprises a substantially uniform screen and said signal contains information relating to optical power contained in each of said optical beams after passing through said transmitting system.

28. The scanner recited in claim 27 in which said decoding means is used to modify said power applied to said light sources.

29. The scanner recited in claim 28 in which said decoding means is used to increased power uniformity of said light beams by modifying said power applied to said light sources.

30. The scanner recited in claim 27 in which said decoding means electronically compensates for nonuniformity in said optical powers in said optical beams.

31. The scanner recited in claim 1 in which at least half of said light beams are emitted in a same first polarization state.

32. The scanner recited in claim 31 in which approximately half of said light beams are emitted in said first polarization state, and the other approximate half of said light beams are emitted in a second polarization state.

33. The scanner recited in claim 1 in which at least two light sources are activated simultaneously with different modulation frequencies, resulting in at least first and second signals having different carrier frequencies approximately equal to said different modulation frequencies.

34. The scanner recited in claim 33 in which said processing means further comprises at least one electronic frequency filter.

35. The scanner recited in claim 34 in which said at least one electronic frequency filter is used to separate said at least first and second signals.

36. A solid-state scanner comprising:

a two-dimensional array of light sources, each said light source emitting a respective light beam when activated, at least one of said light sources being inactive at any given time;

a target which reflects or scatters at least a portion of said light beams;

an optical system for relaying said light beams to said target;

a power supply for activating each of said light sources at an optimal power level to compensate for said transmitting optical system transmissivity of each of said respective light beams;

at least one detector for monitoring light from said sources which is reflected or scattered from said target, said detector generating a signal in response thereto;

transmitting means for transmitting said signal away from said detector;

processing means for interpreting said signal stream to recognize one or more bar code patterns contained on said target; and wherein each of said light sources is sequentially activated and said activation comprises a single scan of a single bar code pattern.

37. The scanner recited in claim 36 in which said light sources are matrix-addressed along rows and columns.

38. The scanner recited in claim 36 in which said light sources comprise vertical-cavity surface-emitting lasers.

39. The scanner recited in claim 36 in which said optical system comprises at least one elements selected from the group consisting of microlenses, microprisms, holograms, birefringent materials, and a combination thereof.

40. A solid-state scanner comprising:

a two-dimensional array of light sources having an array length and an array width, said two-dimensional array emitting a two-dimensional array of light beams, each said light sources emitting a light beam when activated, said two-dimensional array performing single scan of a single bar code pattern;

a power supply for applying power to said light sources;

a target which reflects, absorbs, or scatters light from said sources;

a transmitting optical system for directing said light beams from said light sources to said target such that the ratio of length to width of said two-dimensional array of light beams, after passing through said optical system, is different than the ratio of length to width of said two-dimensional array of light sources, said light sources having a sequential activation and comprising a single scan of said single bar code pattern.

41. A method of operating a scanner comprising the steps of:

imaging upon a field containing a nominally uniform screen a regular sequence of light spots by separately activating a plurality of light sources which generate a respective plurality of light beams;

detecting light reflected or scattered from said screen to produce calibration electrical signals and evaluating said calibration electrical signals to determine the nominal power throughput resulting from activating said plurality of light sources;

using results of said evaluation to modify subsequent operation of said scanner by modifying the power level of each of said plurality of light sources to compensate for transmissivity of each of said respective light beams.

42. The method recited in claim 41 in which said subsequent operation is used in the reading of images and said modification comprises modification of electrical signals resulting from said subsequent reading of images.

43. A method of operating a scanner comprising the steps of:

illuminating upon a field containing an image a known sequence of light spots by separately activating a plurality of light sources which generate a respective plurality of light beams;

detecting light reflected or scattered from said image to produce a plurality electrical signals and evaluating said electrical signals to characterize said image; and modifying operation of said scanner to improve said characterization of said image by modifying the power level of each of said plurality of light sources by modifying the power level of each of said plurality of light sources to compensate for transmissivity of each of said respective light beams.

44. The method recited in claim 43 in which said modification comprises modification of said electrical signals.

45. The method recited in claim 43 in which said modification comprises modification of said characterization.

* * * * *